Dec. 27, 1932.  W. R. HOWARD  1,892,432
PROCESS FOR THE CONVERSION OF HYDROCARBON OILS
Original Filed Dec. 31, 1921
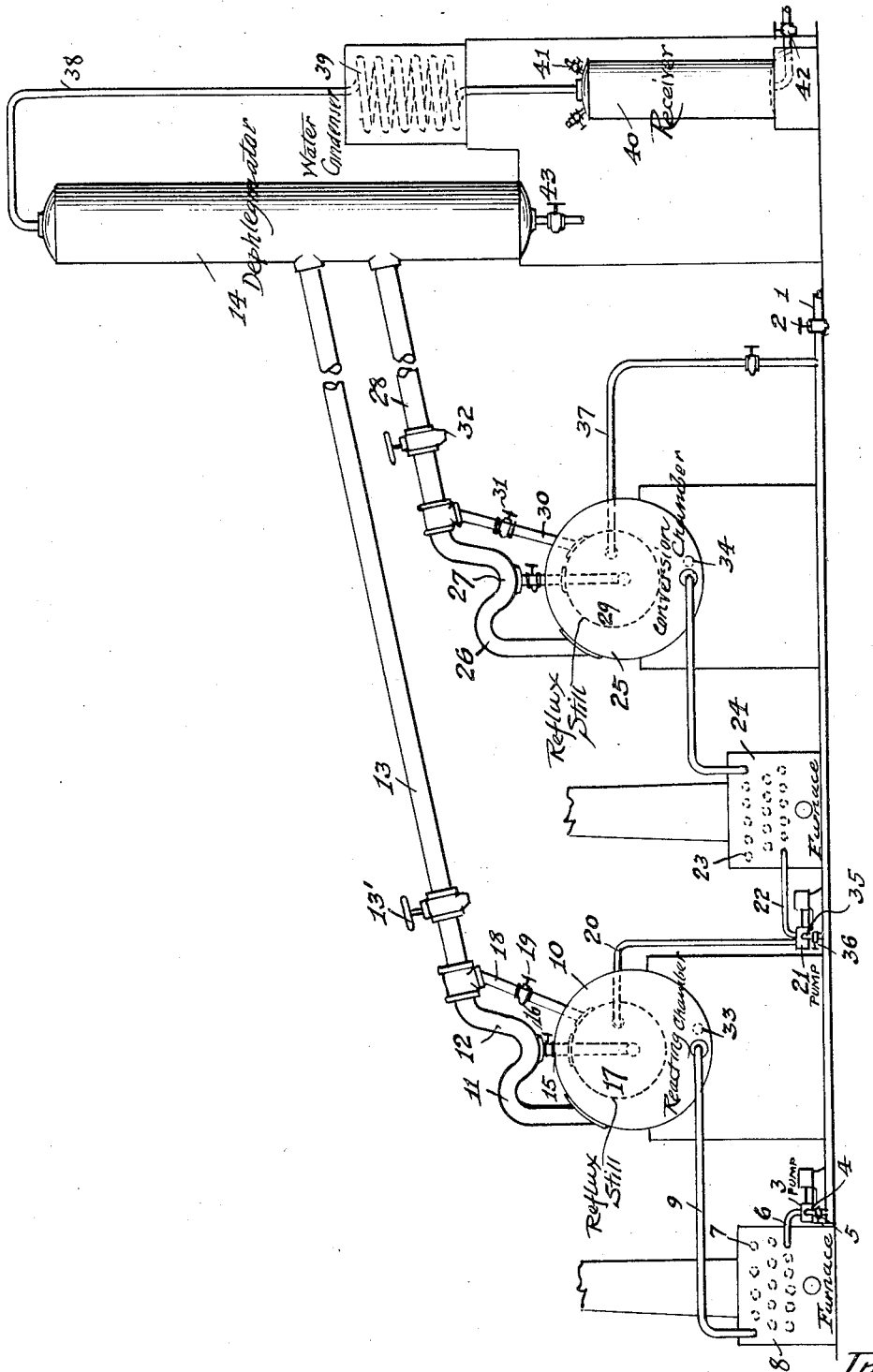
Witness,
Inventor
William R. Howard.
By Frank L. Belknap. Atty.

Patented Dec. 27, 1932

1,892,432

UNITED STATES PATENT OFFICE

WILLIAM R. HOWARD, OF WASHINGTON, DISTRICT OF COLUMBIA, ASSIGNOR TO UNIVERSAL OIL PRODUCTS COMPANY, OF CHICAGO, ILLINOIS, A CORPORATION OF SOUTH DAKOTA

PROCESS FOR THE CONVERSION OF HYDROCARBON OILS

Application filed December 31, 1921, Serial No. 526,174. Renewed May 12, 1927.

This invention relates to improvements in process for converting hydrocarbon oils and refers more particularly to a process in which, in addition to the distillation or conversion of the raw oil charge, the reflux condensate is returned and treated separately to further relieve therefrom lighter fractions contained therein.

The single figure is a diagrammatic side elevational view of the apparatus. Referring to the drawing, the raw oil is introduced from start to the line 1 which is controlled by a valve 2. From the charging line the oil is drawn by means of a pump 3 through the connecting line 4 controlled by a valve 5 and is charged through the line 6 to the heating tubes 7 which are mounted in a furnace 8. Here the oil is raised to a cracking temperature and is directed through a transfer line 9 to a conversion or reacting chamber 10 where the heated oil is permitted to expand and vaporize. The vapors evolved in the conversion or vaporizing chamber pass off through vapor line 11 through the trap 12 and up through line 13 to the dephlegmator 14. A valve 13' is interposed in the vapor line for controlling the volume of vapor permitted to pass therethrough and the relative pressures maintained upon the conversion or vaporizing chamber and the dephlegmating column. A portion of the vapors which pass out through the vapor line 13 are condensed and gravitate back through the vapor line as reflux condensate. This liquid condensate is trapped at 12 and flows down through the line 15 regulated by a valve 16 into the reflux still 17 mounted within the conversion chamber 10. This reflux still is closed preventing the mixing of the reflux with the reacting oil body in the vaporizing chamber. The feature of returning the reflux in this manner and treating it separately in the conversion chamber, is an important factor, as the mixing of the reflux with the oil under treatment tends to raise the boiling point of the reacting oil body and retard to a substantial extent the amount of cracking or conversion which takes place in the vaporizing chamber. A part of the reflux condensate returned to the still 17 being maintained at the high temperature conditions of the conversion zone will be converted, the evolved vapors passing off through the line 18 controlled by a valve 19 to the vapor line 13 and thence to the dephlegmator. The unvaporized reflux will overflow through the line 20 and will be charged by means of the pump 21 through the line 22 to the heating tubes 23 mounted in a furnace 24. Here the overflow reflux condensate from the reflux still 17 will be raised to a sufficient temperature to produce further conversion in the chamber 25 to which it is passed from the furnace 24. The vapors from the conversion chamber 25 pass out through vapor line 26 through a trap 27 and vapor line 28 which likewise connects with the dephlegmating tower 14. In a like manner the reflux condensate separated from the vapors evolved in the vapor chamber 25 are trapped at 27 and flow down into a second reflux still 29 mounted in the chamber 25 similarly to the conversion zone in the initial stage. The vapors evolved in the reflux still 29 pass off as previously explained through a line 30 controlled by a valve 31 communicating with the vapor line 28, and valve 32 in the line 28 functions similarly to the valve 13' in the vapor line 13. It will be noted in connection with both of these stages that the reflux condensate in flowing back through the separate vapor lines may pass down into the stills 17 and 29 through the vapor lines 18 and 30. The traps 12 and 27 are interposed in the larger vapor lines to prevent any return of the reflux condensate to the conversion chambers 10 and 25, thus maintaining at all times a relatively uniform oil body under treatment in the separate vapor chambers 10 and 25. Where reflux condensate is mixed with the oil body under treatment, it tends to materially retard the reaction which takes place in the vaporizing or conversion zone. Residuum draw offs are supplied at 33 and 34 to the separate vaporizing chambers. An auxiliary connection 35 controlled by a valve 36 furnishes a means for drawing raw oil into the system by means of the pump 21 to assist and promote conversion in the secondary chamber 25. The oil which is circulated through the heating tubes 23 is a reflux condensate of a refractory character and difficult to crack. When there is introduced with this oil a regulated amount of raw oil which contains a substantial quantity of the lighter fractions, there is produced an increased conversion or cracking reaction in the chamber 25 as the volatility of the raw oil promotes the vaporization or cracking of the reflux condensate.

The unvaporized oil from the second reflux still 29 is drawn off through the line 37 in the same manner as the condensate was drawn from the tank 17 through the line 20. If desired, a plurality of such stages may be connected together in a battery and each connecting with a single dephlegmator or one or more dephlegmators as desired. The vapors passing through the lines 13 and 28 are refluxed in the dephlegmator 14 and thence passed over through the line 38 to a water condenser 39 and are collected as distillate in the receiver 40 which is equipped with a pressure relief valve 41 and a liquid draw-off valve 42. A drain valve 43 is tapped into the bottom of the dephlegmator for the purpose of drawing off the heavier condensates if desired.

It is common practice in the conversion of oils to return reflux condensate and retreat it with the oil charge in the heating and conversion zones and such retreatment will produce an increased yield of distillate. There is, however, an objection to treating the oil in this manner and that is the fact that to retreat such condensates in an effective manner they must be raised to a higher temperature than that necessary to convert the raw oil charge and under such conditions the increased heat imposed upon the oil tends to cause a collection and accumulation of free carbon due to the rapidity of the cracking of the more volatile oil, whereas where the reflux condensate or more refractory oils are returned and separately treated, this objection is obviated. In the reflux stills mounted in the vapor chambers there will be but a limited amount of cracking due to the fact that the temperature therein is not sufficient to convert any substantial quantity of this refractory product. This treatment, however, in connection with the adjoining apparatus through which the unconverted reflux is passed and there subjected to increased temperature conditions, relieves the reflux condensate of the greater part of its lighter or low boiling point fractions. The added charge introduced with the reflux as a limited amount of untreated oil, facilitates the conversion in the second zone of heating. It is understood that although but two stages are shown in the drawing, a plurality of such stages may be connected in series and the oil retreated until it has been relieved of all of the desired distillates.

I claim as my invention:—

1. A process of converting hydrocarbon oil consisting in passing oil in a coil through a heating zone where it is heated to a cracking temperature, in introducing the highly heated oil to a vapor chamber, in discharging vapors from said chamber to a reflux condenser, in introducing reflux condensate from said condenser to a reflux still disposed within said vapor chamber, in discharging vapors from the reflux still to the reflux condenser, in withdrawing unvaporized reflux condensate from said still and introducing said condensate to a second still where the same is heated to cracking temperatures, and in discharging vapors from said second still while maintaining the entire apparatus under a superatmospheric pressure.

2. A process of converting hydrocarbon oil, consisting in passing oil in a coil through a heating zone where it is heated to a cracking temperature, in introducing the highly heated oil to a vapor chamber, in discharging vapors from said chamber to a reflux condenser in introducing reflux condensate from said condenser to a reflux still disposed within said vapor chamber, in discharging vapors from the reflux still to the reflux condenser, in withdrawing unvaporized reflux condensate from said still and introducing said condensate to a second still where the same is heated to cracking temperatures, in introducing vapors from said second still to a dephlegmator, in returning reflux condensate to an independent receiver in said second still, in discharging vapors from said receiver to the dephlegmator, and in withdrawing for retreatment unvaporized reflux condensate in said receiver.

3. A process for cracking hydrocarbon oil comprising initially raising the oil to a cracking temperature in a heating zone, delivering the heated oil to an enlarged reaction zone wherein conversion occurs, subjecting the vapors evolved from the oil to reflux condensation in a reflux condensing zone, collecting reflux condensate separated from the vapors in a collecting zone apart from said reflux condensing zone and maintained at a higher temperature than the reflux condensing zone, passing reflux condensate from said collecting zone through independent heating means wherein it is subjected to conditions adapted to effect further conversion thereof, delivering reflux condensate subsequent to passage through said independent heating means to a separate reaction chamber, and taking off vaporous constituents from said separate reaction chamber for dephlegmation and condensation.

4. A process for cracking hydrocarbon oil comprising maintaining a body of oil under cracking conditions of temperature and pressure, subjecting vapors evolved from the oil to reflux condensation, collecting the reflux condensate in a collecting zone, supplying reflux condensate from said collecting zone to an independent heating zone, subjecting the reflux condensate in said independent heating zone to cracking conditions adapted to effect a further conversion thereof, separating the vapors from the reflux condensate subsequent to its passage through said independent heating zone, subjecting such vapors to an independent reflux condensing action, uniting condensed fractions separated from the vapors by said independent reflux condensing action with charging oil for the process, and admitting the resultant mixture to the first mentioned body of oil.

5. A process for cracking hydrocarbon oil comprising mainaining a body of oil in one zone under cracking conditions of temperature and pressure, removing vapors evolved from such body of oil, subjecting such vapors to reflux condensation, collecting the reflux condensate separated from said vapors in a collecting zone heated by hot oil undergoing treatment in the process without permitting the same to commingle with such hot oil, passing the reflux condensate from said collecting zone to a second zone, subjecting the reflux condensate to the cracking conditions of temperature in such second zone and taking off vaporous constituents from said reflux condensate subsequent to passage through said second zone.

6. A process for cracking hydrocarbon oil comprising passing charging oil through an initial heating zone wherein it is raised to a cracking temperature, thence delivering the charging oil to an enlarged reaction chamber wherein substantial conversion takes place, subjecting vapors evolved from the oil to reflux condensation in a reflux condensing zone, collecting reflux condensate separated from the vapors undergoing reflux condensation in a collecting zone apart from said zone of reflux condensation, wherein no substantial decrease in temperature of the reflux condensate is effected, removing reflux condensate from said collecting zone, uniting therewith regulated quantities of charging oil of the character supplied to said initial heating zone, passing the united reflux condensate and charging oil through a secondary heating zone wherein the united reflux condensate and charging oil is subjected to such conditions as will effect a further conversion of the reflux condensate, and recovering the converted constituents of the oil subsequent to its passage through said secondary heating zone.

WILLIAM R. HOWARD.